(12) United States Patent
Lu

(10) Patent No.: US 12,126,250 B2
(45) Date of Patent: Oct. 22, 2024

(54) MULTIPLE-INPUT POWER SUPPLY AND CONTROL METHOD

(71) Applicant: AA Power Inc., Boston, MA (US)

(72) Inventor: Qun Lu, Lexington, MA (US)

(73) Assignee: AA Power Inc., Boston, MA (US)

( * ) Notice: Subject to any disclaimer, the term of this patent is extended or adjusted under 35 U.S.C. 154(b) by 248 days.

(21) Appl. No.: 17/805,536

(22) Filed: Jun. 6, 2022

(65) Prior Publication Data

US 2023/0026740 A1 Jan. 26, 2023

Related U.S. Application Data

(60) Provisional application No. 63/223,670, filed on Jul. 20, 2021.

(51) Int. Cl.
| | |
|---|---|
| *H02M 3/335* | (2006.01) |
| *H02J 9/06* | (2006.01) |
| *H02M 1/00* | (2006.01) |
| *H02M 7/219* | (2006.01) |
| *G06F 1/26* | (2006.01) |
| *H02M 1/32* | (2007.01) |

(Continued)

(52) U.S. Cl.
CPC ........... *H02M 1/0096* (2021.05); *H02J 9/061* (2013.01); *H02M 3/33507* (2013.01); *H02M 3/33538* (2013.01); *H02M 7/219* (2013.01); *G06F 1/263* (2013.01); *H02M 1/32* (2013.01); *H02M 1/36* (2013.01); *H02M 1/4225* (2013.01)

(58) Field of Classification Search
CPC ........ H02J 9/061; H02J 3/007; H02M 1/4208; H02M 1/4225; H02M 7/1552; H02M 7/17; H02M 7/219; H02M 1/36; H02M 7/23; H02M 1/0096; H02M 1/32
See application file for complete search history.

(56) References Cited

U.S. PATENT DOCUMENTS

| | | | | |
|---|---|---|---|---|
| 5,731,969 | A | * | 3/1998 | Small ................... H02M 7/2173 363/69 |
| 2013/0063185 | A1 | * | 3/2013 | Ye ...................... H02M 3/33571 327/108 |

(Continued)

OTHER PUBLICATIONS

Wiley Electrical and Electronics Engineering Dictionary, Wiley-IEEE Press, pp. 764 (Year: 2004).*

*Primary Examiner* — Alex Torres-Rivera
(74) *Attorney, Agent, or Firm* — AP3 Law Firm PLLC

(57) ABSTRACT

A dual-input power conversion system includes a first primary side power network comprising a first hold-up capacitor, wherein the first primary side power network has inputs configured to be coupled to a first power source, and outputs coupled to a transformer, a second primary side power network comprising a second hold-up capacitor, wherein the second primary side power network has inputs configured to be coupled to a second power source, and outputs coupled to the transformer, and a secondary side power network having inputs coupled to a secondary side of the transformer, and outputs coupled to a load, wherein the first primary side power network and the second primary side power network are configured such that a voltage across one of the first hold-up capacitor and the second hold-up capacitor is maintained by a voltage reflected from the secondary side to a corresponding primary side.

26 Claims, 10 Drawing Sheets

(51) Int. Cl.
*H02M 1/36* (2007.01)
*H02M 1/42* (2007.01)

(56) References Cited

U.S. PATENT DOCUMENTS

| | | | |
|---|---|---|---|
| 2015/0078036 A1* | 3/2015 | Jovanovic | H02M 3/33573 363/17 |
| 2015/0333640 A1* | 11/2015 | Persson | H02M 1/08 363/21.04 |
| 2017/0170733 A1* | 6/2017 | Ferencz | H02M 3/33571 |
| 2022/0103094 A1* | 3/2022 | Torrico-Bascopé | H02M 7/81 |
| 2022/0123664 A1* | 4/2022 | Yu | G06F 11/3058 |

\* cited by examiner

MULTIPLE-INPUT POWER SUPPLY AND CONTROL METHOD

PRIORITY

This application claims the benefit of U.S. Provisional Application No. 63/223,670, filed on Jul. 20, 2021, entitled "Dual-Input Redundant AC/DC Power Supply for Information Technology Equipment in a Data Center," which application is hereby incorporated herein by reference.

TECHNICAL FIELD

The present invention relates to a multiple-input power supply and control method, and, in particular embodiments, to a dual-input power supply for efficiently supplying power for information technology (IT) power applications.

BACKGROUND

As technologies further advance, a variety of Internet based information processing services, such as media streaming, cloud computing and/or the like, have become popular. The Internet based information processing services require sharing information over networks. The information sharing over the networks demands a plurality of data centers for collecting, storing, processing, and distributing a large amount of data used in the information processing services.

A data center is a facility (e.g., one building) configured to house a large number of computer servers and associated components. The large number of computer servers are configured to process and respond to information service requests (e.g., multimedia streaming) from various users connected to the data center through the Internet.

Data center power is an essential element in designing and operating efficient and reliable data centers. Most data centers obtain their primary electricity from the electric grid. To ensure that the data centers operate in a smooth and reliable manner at all times, redundant or backup power supplies are employed to provide a steady supply of clean, uninterrupted electricity. For example, a data center may be connected to the electric grid through two independent power paths (e.g., two independent power substations). Furthermore, at least one fuel generator is connected to the data center. The fuel generator functions as a backup power supply. Once the power from the electric grid is interrupted, the fuel generator is activated to supply electrical power to the data center. Due to the long startup time of the fuel generator, there is a time delay for the fuel generator to deliver full power. In order to keep the data center operating continuously and without interruption, at least one Uninterruptible Power Supply (UPS) is connected to the data center. The UPS includes batteries that can provide instantaneous power upon loss of the electric grid power.

In order to achieve reliable IT power, IT equipment with redundant power supplies (e.g., dual power supplies) is a common practice for reliably operating critical loads. For example, a power conversion system of the data center is coupled between the power sources (e.g., ac power from the electric grid) and the load (e.g., the servers in the data center). The power sources may be implemented as two power supplies. A first power supply is connected to a first ac power source. A second power supply is connected to a second ac power source. These two ac power sources are independent from each other. This power conversion system provides two power delivery paths from the two ac power sources to the load (e.g., servers). As a result, the power conversion system is able to achieve input redundancy. A switch may be employed to select which power delivery path is used to deliver power from the ac power sources to the load. The switch can be implemented as a high-voltage switch whose contacts are opened and closed in oil. Alternatively, the switch can be implemented as a mechanical relay.

In operation, if one ac power source is interrupted, the switch is able to switch the power delivery from the failed power delivery path to the other delivery path. The two most common switches described above are mechanical switches. The mechanical switches are not able to achieve rapid switching. As a result, the power conversion system has to have a large hold-up capacitor so that the power can be sustained continuously when a fault occurs. It would be desirable to have a reliable, cost-effective and long life power conversion system to supply power to the data center continuously in various operating conditions.

SUMMARY

These and other problems are generally solved or circumvented, and technical advantages are generally achieved, by preferred embodiments of the present disclosure which provide a multiple-input power supply and control method.

In accordance with an embodiment, a power conversion system comprises a first primary side power network comprising a first hold-up capacitor, wherein the first primary side power network has inputs configured to be coupled to a first power source, and outputs coupled to a transformer, a second primary side power network comprising a second hold-up capacitor, wherein the second primary side power network has inputs configured to be coupled to a second power source, and outputs coupled to the transformer, and a secondary side power network having inputs coupled to a secondary side of the transformer, and outputs coupled to a load, wherein the first primary side power network and the second primary side power network are configured such that a voltage across one of the first hold-up capacitor and the second hold-up capacitor is maintained by a voltage reflected from the secondary side to a corresponding primary side.

In accordance with another embodiment, a method comprises providing a dual-input power conversion system having two inputs coupled to a first ac power source and a second ac power source, respectively, wherein the dual-input power conversion system comprises, a first primary side power network comprising a first power converter, a first hold-up capacitor and a first primary switch coupled between the first ac power source and a first primary winding of a transformer, a second primary side power network comprising a second power converter, a second hold-up capacitor and a second primary switch coupled between the second ac power source and a second primary winding of the transformer, and a secondary side power network coupled between a secondary side of the transformer and a load, detecting whether both the first ac power source and the second ac power source are available, and in response to two available ac power sources, disabling one of the first power converter and the second power converter, and configuring the first primary switch and the second primary switch to operate in a sync manner so that a voltage across one of the first hold-up capacitor and the second hold-up capacitor is maintained by a voltage reflected from the secondary side to a corresponding primary side.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a dual-input power conversion system and control method. The disclosure may also be applied, however, to a variety of power conversion systems. Hereinafter, various embodiments will be explained in detail with reference to the accompanying drawings.

Figure 1:
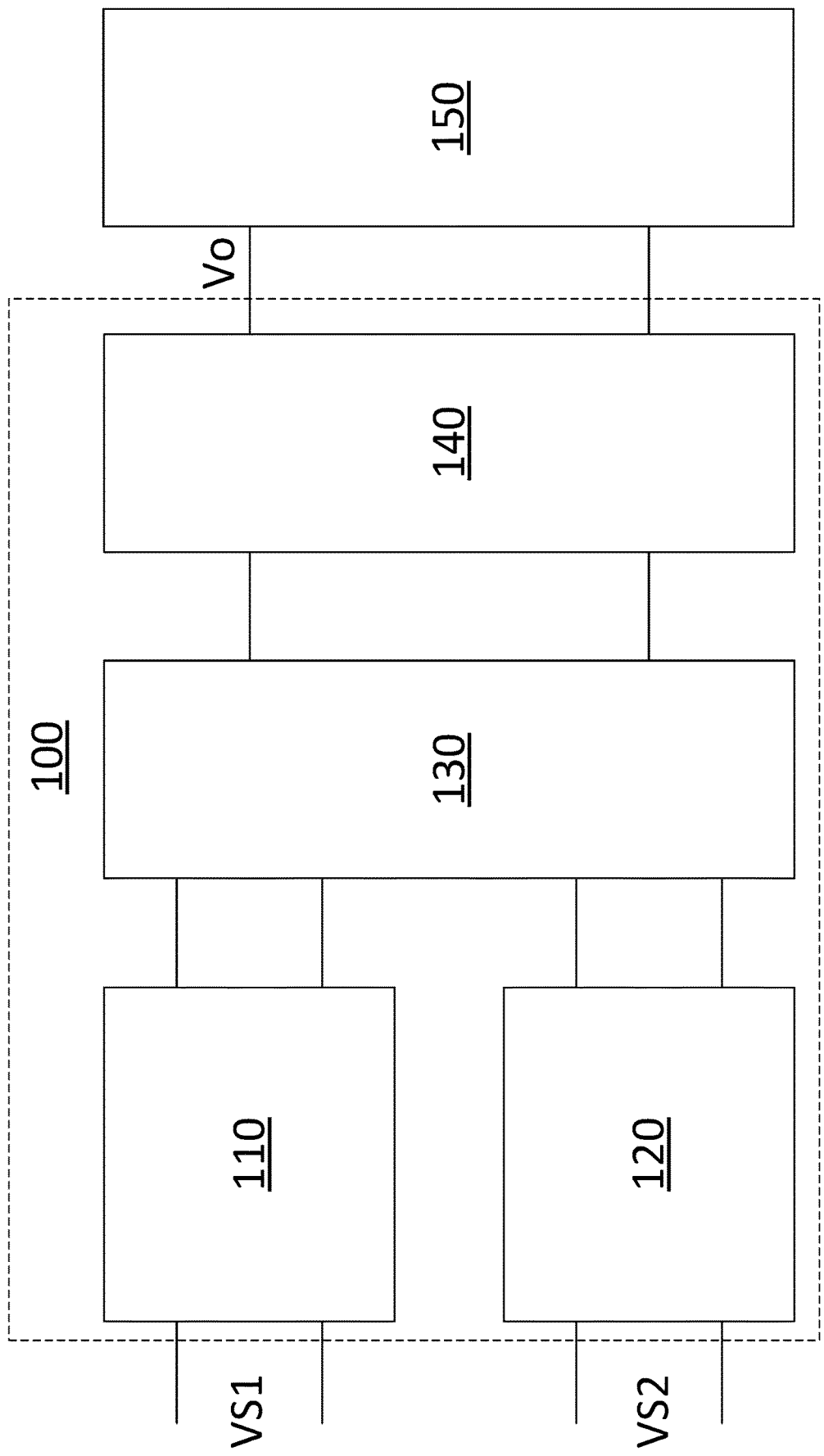
FIG. 1 illustrates a block diagram of a dual-input power conversion system in accordance with various embodiments of the present disclosure.

FIG. 1 illustrates a block diagram of a dual-input power conversion system in accordance with various embodiments of the present disclosure. The dual-input power conversion system 100 comprises a first primary side power network 110, a second primary side power network 120, a magnetic coupling apparatus 130 and a secondary side power network 140. As shown in FIG. 1, the inputs of the first primary side power network 110 are coupled to a first ac power source VS1. The outputs of the first primary side power network 110 are coupled to a primary side of the magnetic coupling apparatus 130. The inputs of the second primary side power network 120 are coupled to a second ac power source VS2. The outputs of the second primary side power network 120 are coupled to the primary side of the magnetic coupling apparatus 130. The secondary side of the magnetic coupling apparatus 130 is coupled to a load 150 through the secondary side power network 140.

In some embodiments, the load 150 is the IT equipment in a data center. The first ac power source VS1 and the second ac power source VS2 are independent from each other. For example, VS1 is generated from a first power substation of the electric grid. VS2 is generated from a second power substation of the electric grid. Alternatively, VS1 and VS2 are from a same power source. The power delivery path of VS1 is different from the power delivery path of VS2. It should be noted that the dual-input power conversion system 100 is not coupled to VS1 and VS2 directly. Some power conversion elements such as rectifiers and filters may be coupled between the ac power sources VS1, VS2 and the dual-input power conversion system 100.

In some embodiments, the magnetic coupling apparatus 130 is implemented as a transformer. Throughout the description, the magnetic coupling apparatus 130 may be alternatively referred to a transformer. In some embodiments, the transformer 130 has two primary windings and one secondary wining. A first primary winding is connected to the first primary side power network 110. A second primary winding is connected to the second primary side power network 120. A secondary winding is connected to the secondary side power network 140.

Figure 2:
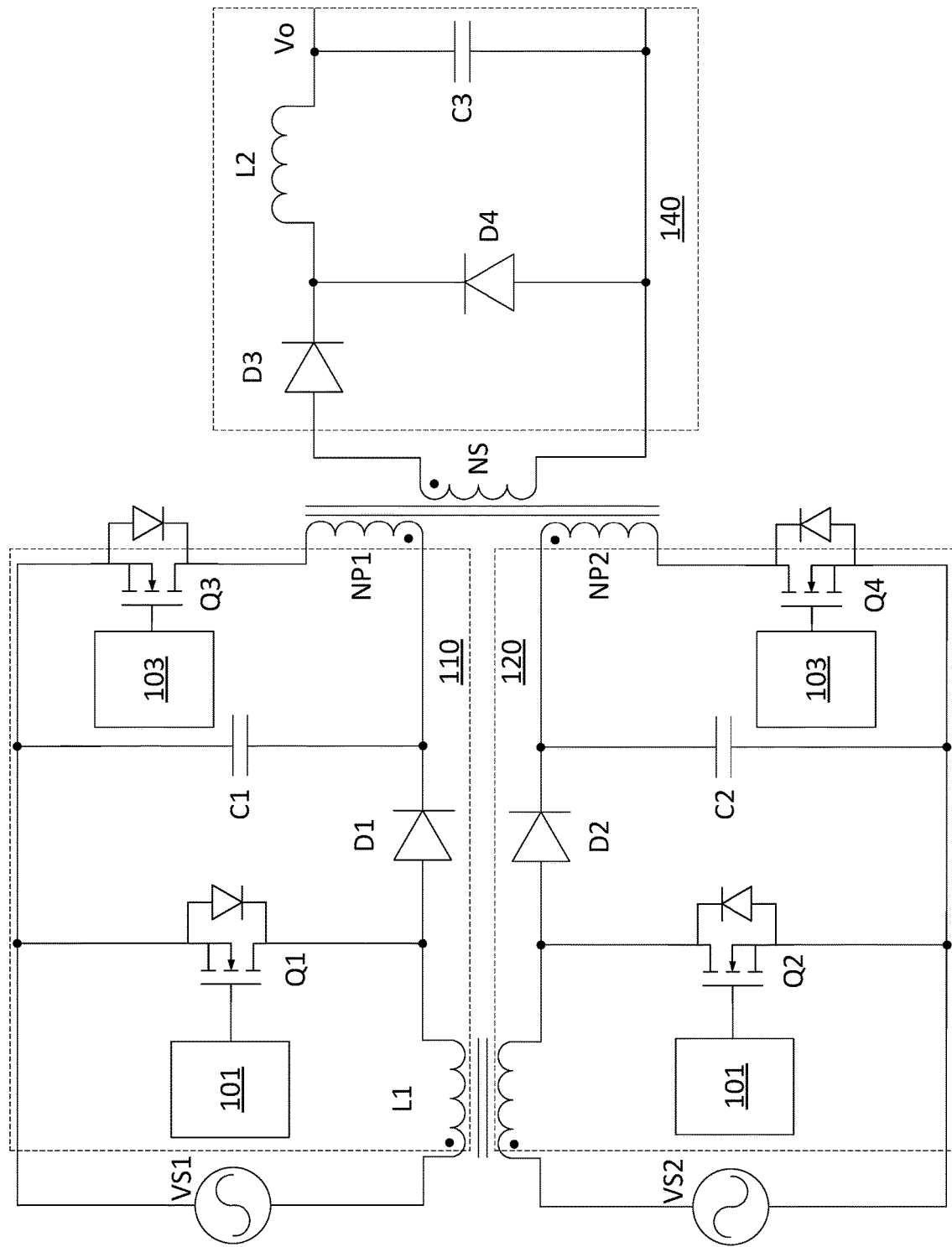
FIG. 2 illustrates a schematic diagram of a first implementation of the dual-input power conversion system shown in FIG. 1 in accordance with various embodiments of the present disclosure.

In some embodiments, the first primary side power network 110 comprises a first power converter (e.g., a first boost converter formed by Q1, D1 and a first winding of L1 shown in FIG. 2), a first hold-up capacitor (e.g., hold-up capacitor C1 shown in FIG. 2) and a primary side circuit (e.g., Q3 and NP1 shown in FIG. 2) of an isolated power converter (e.g., isolated converter formed by Q3, NP1 and NS shown in FIG. 2) such as a forward converter, a flying converter, a fly-forward converter, a full bridge converter, a half bridge converter, an inductor-inductor-capacitor (LLC) resonant converter, any combinations thereof and the like. The second primary side power network 120 comprises a second power converter (e.g., a second boost converter formed by Q2, D2 and a second winding of L1 shown in FIG. 2), a second hold-up capacitor (e.g., hold-up capacitor C2 shown in FIG. 2) and a primary side circuit (e.g., Q4 and NP2 shown in FIG. 2) of another isolated power converter (e.g., isolated converter formed by Q4, NP2 and NS shown in FIG. 2) such as a forward converter, a flying converter, a fly-forward converter, a full bridge converter, a half bridge converter, an LLC resonant converter, any combinations thereof and the like.

In some embodiments, the first power converter is implemented as a first boost converter. The second power converter is implemented as a second boost converter. In order to achieve better system performance, the inductor of the first boost converter and the inductor of the second boost converter are magnetically coupled to each other to form a coupled inductor.

The secondary side power network 140 may comprises a rectifier and a filter. The rectifier converts an alternating polarity waveform received from the transformer 130 to a single polarity waveform. The rectifier may be formed of one pair of switching elements such as n-type metal oxide semiconductor (NMOS) transistors. Alternatively, the rectifier may be formed of one pair of diodes. The filter is employed to produce a steady and smooth output voltage at the output Vo of the dual-input power conversion system 100.

In operation, a system controller (not shown) is configured to determine whether both ac sources VS1 and VS2 are available. Once both ac sources are available, the system controller disables one power converter (e.g., the first converter in 110) and enables the other power converter (e.g., the second converter in 120). At the same time, both the primary circuits are turned on and off in a sync manner. Although the first power converter has been disabled, the voltage on the first hold-up capacitor is maintained by a voltage reflected from the secondary side to the primary side where the first hold-up capacitor is located. In other words, both the first hold-up capacitor and the second hold-up capacitor function as energy storage elements. When a fault occurs in the second power source VS2, both the first hold-up capacitor and the second hold-up capacitor function effectively as a single large hold-up capacitor providing power to the load 150 through the transformer 130. In response to the fault in the second power source VS2, the second power converter is disabled, and the first power converter is enabled. After the first power converter has been enabled, the first power source VS1 is able to provide power to the load 150.

One advantageous feature of having the dual-input power conversion system 100 shown in FIG. 1 is that the dual-input power conversion system 100 is able to have a fast transition in response to a system fault. Furthermore, while only one power converter is enabled, both the first hold-up capacitor and the second hold-up capacitor function as energy storage elements. These two hold-up capacitors function as a single hold-up capacitor, thereby increasing the effective hold-up time when the system fault occurs.

FIG. 2 illustrates a schematic diagram of a first implementation of the dual-input power conversion system shown in FIG. 1 in accordance with various embodiments of the present disclosure. The dual-input power conversion system has two inputs coupled to a first ac power source VS1 and a second ac power source VS2, respectively. As shown in FIG. 2, the dual-input power conversion system comprises a first primary side power network 110, a second primary side power network 120, a transformer and a secondary side power network 140.

The first primary side power network 110 comprises a first power converter, a first hold-up capacitor C1 and a first primary switch Q3 coupled between the first ac power source VS1 and a first primary winding NP1 of the transformer. The second primary side power network 120 comprises a second power converter, a second hold-up capacitor C2 and a second primary switch Q4 coupled between the second ac power source VS2 and a second primary winding NP2 of the transformer. The secondary side power network 140 is coupled between a secondary side of the transformer and a load (not shown but illustrated in FIG. 1).

In some embodiments, hold-up capacitors C1 and C2 are electrolytic capacitors. In alternative embodiments, hold-up capacitors C1 and C2 may be implemented as other suitable capacitors such as ceramic capacitors, polymer capacitors, any combinations thereof and the like.

As shown in FIG. 2, the first power converter is a first boost converter. The first boost converter is configured to operate as a power factor correction stage of the dual-input power conversion system. Q3 and NP1 form a primary side circuit of a first forward converter. The first forward converter is configured to covert the voltage across the first hold-up capacitor C1 into a voltage suitable for the load connected at the output Vo of the dual-input power conversion system. Likewise, the second power converter is a second boost converter. The second boost converter is configured to operate as a power factor correction stage of the dual-input power conversion system. Q4 and NP2 form a primary side circuit of a second forward converter. The second forward converter is configured to covert the voltage across the second hold-up capacitor C2 into a voltage suitable for the load connected at the output Vo of the dual-input power conversion system. In some embodiments, NP1 is equal to NP2. The voltage across C1 is equal to the voltage across C2. In alternative embodiments, NP1 is not equal to NP2. The voltage across C1 is not equal to the voltage across C2. The system shown in FIG. 2 is able to operate correctly through applying a suitable control algorithm to the system.

It should be noted the primary side circuit (e.g., Q3 and NP1) of the forward converter shown in FIG. 2 is merely an example, which should not unduly limit the scope of the claims. One of ordinary skill in the art would recognize many variations, alternatives, and modifications. For example, depending on different applications and design needs, other relevant circuits such as an active clamp may be included to achieve better efficiency.

As shown in FIG. 2, the first boost converter comprises a first magnetic element, a first switch Q1 and a first diode D1. The first hold-up capacitor C1 functions as an output capacitor of the first boost converter. The first magnetic element is an inductor, which is formed by a first winding of L1. As shown in FIG. 2, a first terminal of the first magnetic element is coupled to a first input of the first primary side power network 110. A second terminal of the first magnetic element is coupled to an anode of the first diode D1. The first switch Q1 is coupled between a common node of the first magnetic element and the first diode D1, and a second input of the first primary side power network 110. The first hold-up capacitor C1 is coupled between a cathode of the first diode D1 and the second input of the first primary side power network 110.

As shown in FIG. 2, the second boost converter comprises a second magnetic element, a second switch Q2 and a second diode D2. The second hold-up capacitor C2 functions as an output capacitor of the second boost converter. The second magnetic element is an inductor, which is formed by a second winding of L1. As shown in FIG. 2, a first terminal of the second magnetic element is coupled to a first input of the second primary side power network 120. A second terminal of the first magnetic element is coupled to an anode of the second diode D2. The second switch Q2 is coupled between a common node of the second magnetic element and the second diode D2, and a second input of the second primary side power network 120. The second hold-up capacitor C2 is coupled between a cathode of the second diode D2 and the second input of the second primary side power network 120.

As shown in FIG. 2, the first magnetic element of the first boost converter and the second magnetic element of the second boost converter are magnetically coupled to each other to form a coupled inductor L1. A controller 101 is configured to generate gate drive signals for the first switch Q1 and the second switch Q2. In some embodiments, the controller 101 is a power management integrated circuit. Alternatively, the controller 101 may be a microcontroller, a digital signal processor (DSP) and the like.

The primary side circuit of the first forward converter comprises the first primary switch Q3 and the first primary winding NP1 of the transformer connected in series. Likewise, the primary side circuit of the second forward converter comprises a second primary switch connected Q4 in series with a second primary winding NP2 of the transformer. A controller 103 is configured to generate gate drive signals for the first primary switch Q3 and the second primary switch Q4.

The secondary side power network 140 comprises a rectifier and a filter connected in cascade between the secondary side of the transformer and the load. As shown in FIG. 2, the rectifier comprises a first rectifier diode D3 and a second rectifier diode D4. The filter comprises an output inductor L2 and an output capacitor C3. As shown in FIG. 2, an anode of the first rectifier diode D3 is connected to a first terminal of a secondary winding NS of the transformer. An anode of the second rectifier diode D4 is connected to a second terminal of the secondary winding NS of the transformer. A cathode of the first rectifier diode D3 and a cathode of the second rectifier diode D4 are connected together and further connected to a first terminal of the output inductor L2. A second terminal of the output inductor L2 is connected to a first terminal of the output capacitor C3. A second terminal of the output capacitor C3 is connected to the second terminal of the secondary winding NS of the transformer.

In some embodiments, Q3 of the first primary side power network 110, Q4 of the second primary side power network 120, the transformer, the secondary side power network 140 and the filter form a converter with a forward topology. In operation, one of the power converters (e.g., the second power converter) may be disabled in response to two available ac power sources. Both Q3 and Q4 are turned on and off in a sync manner. The conduction of Q4 helps to maintain the voltage across the hold-up capacitor C2 after the second power converter has been disabled. The voltage across the hold-up capacitor C2 is maintained at a level equal to a reflected voltage from the secondary side (NS) to the primary side (NP2). In other words, the voltage across the hold-up capacitor C2 is equal to (Vo×NP2)/NS. Likewise, when the first power converter is disabled, both Q3 and Q4 are turned on and off in a sync manner. The conduction of Q3 helps to maintain the voltage across the hold-up capacitor C1 after the first power converter has been disabled. The voltage across the hold-up capacitor C1 is maintained at a level equal to a reflected voltage from the secondary side (NS) to the primary side (NP1). In other words, the voltage across the hold-up capacitor C1 is equal to (Vo×NP1)/NS. In some embodiments, NP1 is equal to NP2. The voltage across the hold-up capacitor C1 is approximately equal to the voltage across the hold-up capacitor C2.

It should be noted that the diagram shown in FIG. 2 is merely an example, which should not unduly limit the scope of the claims. One of ordinary skill in the art would recognize many variations, alternatives, and modifications. For example, the first power converter may be implemented as any other suitable power factor correction devices. Furthermore, both D1 and D2 may be replaced by high efficiency switching elements.

In accordance with an embodiment, the switches of FIG. 2 (e.g., switches Q1-Q4) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should be noted while FIG. 2 shows the switches Q1-Q4 are implemented as single n-type transistors, a person skilled in the art would recognize there may be many variations, modifications and alternatives. For example, depending on different applications and design needs, at least some of the switches may be implemented as p-type transistors. Furthermore, each switch shown in FIG. 2 may be implemented as a plurality of switches connected in parallel. Moreover, a capacitor may be connected in parallel with one switch to achieve zero voltage switching (ZVS)/zero current switching (ZCS).

In operation, Q1 of the first converter and Q2 of the second converter are turned on and off at the same time. Due to various mismatches, the voltage across one hold-up capacitor (e.g., C1) may be higher than the voltage across the other hold-up capacitor (e.g., C2). Due to the magnetic coupling, the converter coupled to the hold-up capacitor having a lower voltage may provide less power to the load.

In operation, a system controller (not shown) is configured to determine whether both ac power sources are available. Once both ac power sources are available, the system controller turns off the switch of one power converter (e.g., Q1) and maintains the normal operation of the switch of the other power converter (e.g., Q2). At the same time, both Q3 and Q4 are turned on and off in a sync manner. Although Q1 has been disabled, the voltage on the first hold-up capacitor C1 is maintained by a voltage reflected from the secondary side to the primary side.

In operation, there may be two ways to disable one of the power converters. In some embodiments, during the startup process of the dual-input power conversion system, both power converters are configured to operate concurrently. The voltages across C1 and C2 are established during the startup process. The bias voltage of the system controller is also established during the startup process. The bias voltage may be generated from the voltages across C1 and C2. Once the bias voltage has been established, the system controller detects whether both ac power sources are available. Once both ac power sources are available, the system controller may disable one power converter. In alternative embodiments, before the two power converters are enabled, the bias voltage of the system controller is generated by a dedicated bias power supply (e.g., an ac/dc converter). Once the bias voltage has been established, the system controller detects whether both ac power sources are available. Once both ac power sources are available, the system controller may only enable one power converter.

Figure 3:
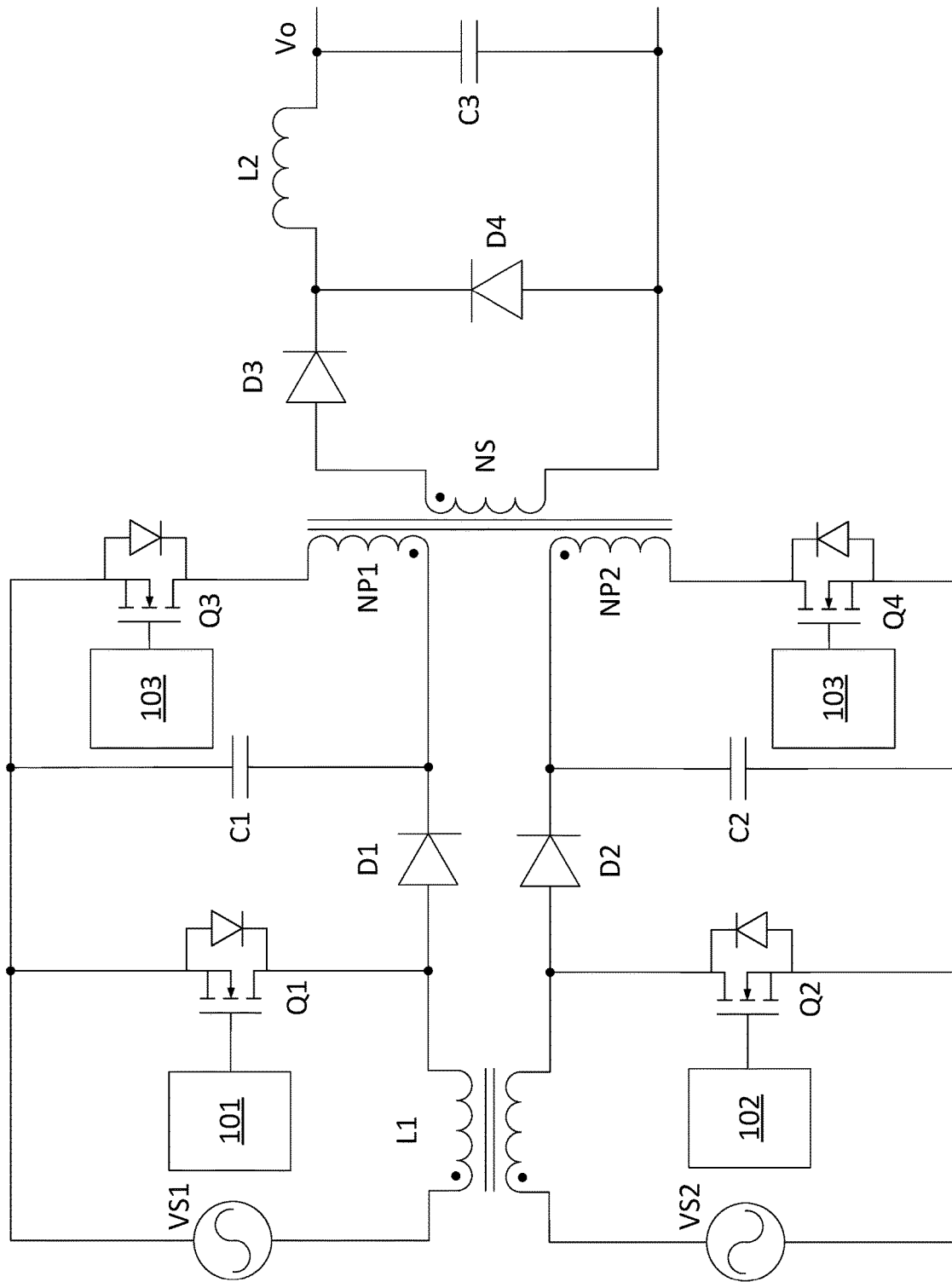
FIG. 3 illustrates a schematic diagram of a second implementation of the dual-input power conversion system shown in FIG. 1 in accordance with various embodiments of the present disclosure.

FIG. 3 illustrates a schematic diagram of a second implementation of the dual-input power conversion system shown in FIG. 1 in accordance with various embodiments of the present disclosure. The second implementation of the dual-input power conversion system shown in FIG. 3 is similar to the first implementation of the dual-input power conversion system shown in FIG. 2 except that two controllers are employed to control Q1 and Q2. As shown in FIG. 3, a first controller 101 is configured to generate gate drive signals for the first switch Q1. A second controller 102 is configured to generate gate drive signals for the second switch Q2. In some embodiments, Q1 and Q2 are not turned on and off at the same time. In alternative embodiments, Q1 and Q2 are in opposite states with one being in a conducting state and the other being in a non-conducting state.

It should be noted that the system configuration (two controllers for controlling two switches) shown FIG. 3 is applicable to all other embodiments in the present disclosure. In other words, the system configuration variation shown in FIG. 3 can be combined with other embodiments in the present disclosure.

Figure 4:
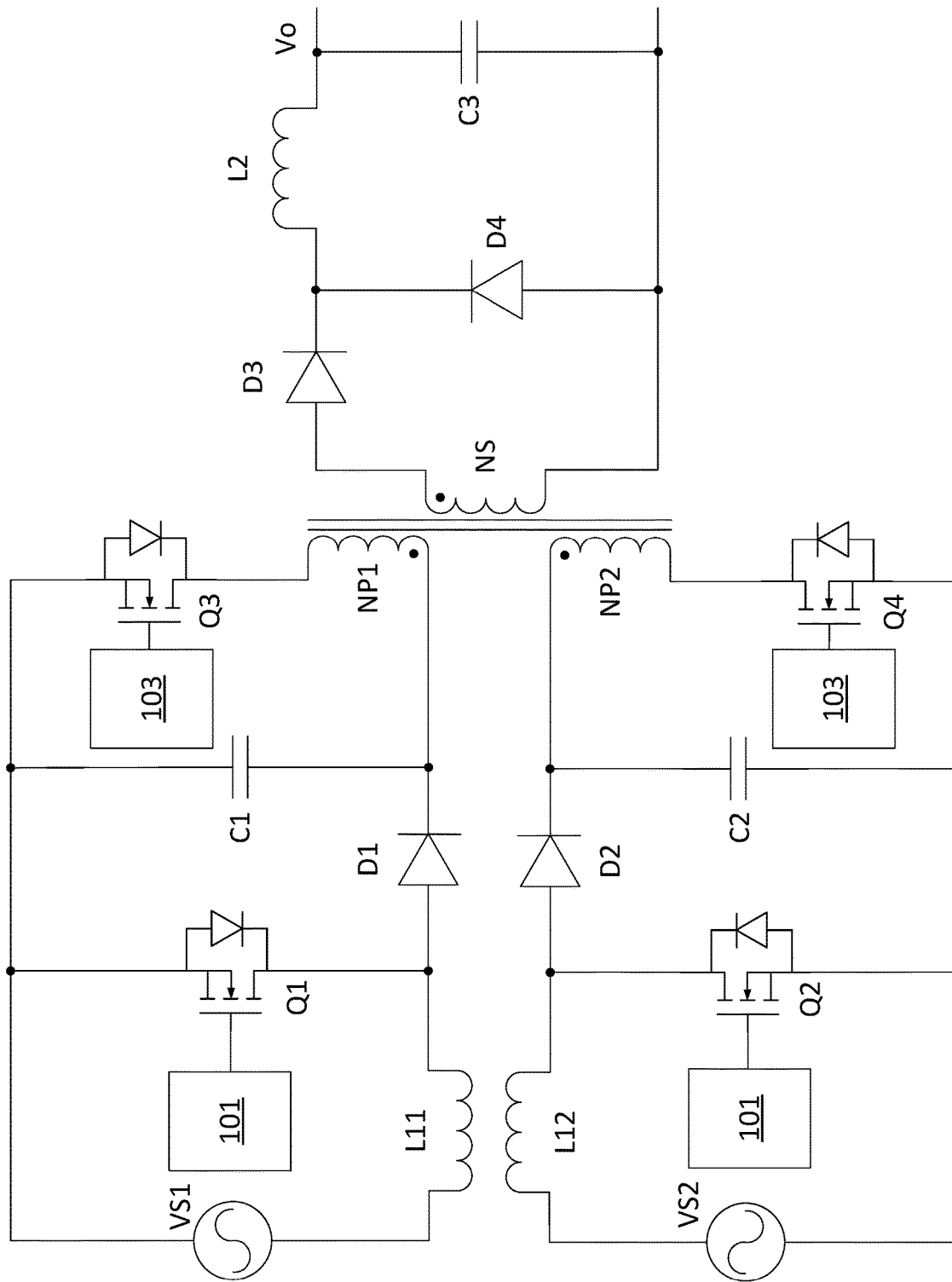
FIG. 4 illustrates a schematic diagram of a third implementation of the dual-input power conversion system shown in FIG. 1 in accordance with various embodiments of the present disclosure.

FIG. 4 illustrates a schematic diagram of a third implementation of the dual-input power conversion system shown in FIG. 1 in accordance with various embodiments of the present disclosure. The third implementation of the dual-input power conversion system shown in FIG. 4 is similar to the first implementation of the dual-input power conversion system shown in FIG. 2 except that the coupled inductor L1 is replaced by two separate inductors L11 and L12. As shown in FIGS. 4, L11 and L12 are not magnetically coupled to each other.

It should be noted that the system configuration (replacing the coupled inductor with two separate inductors) shown FIG. 4 is applicable to all other embodiments in the present disclosure.

Figure 5:
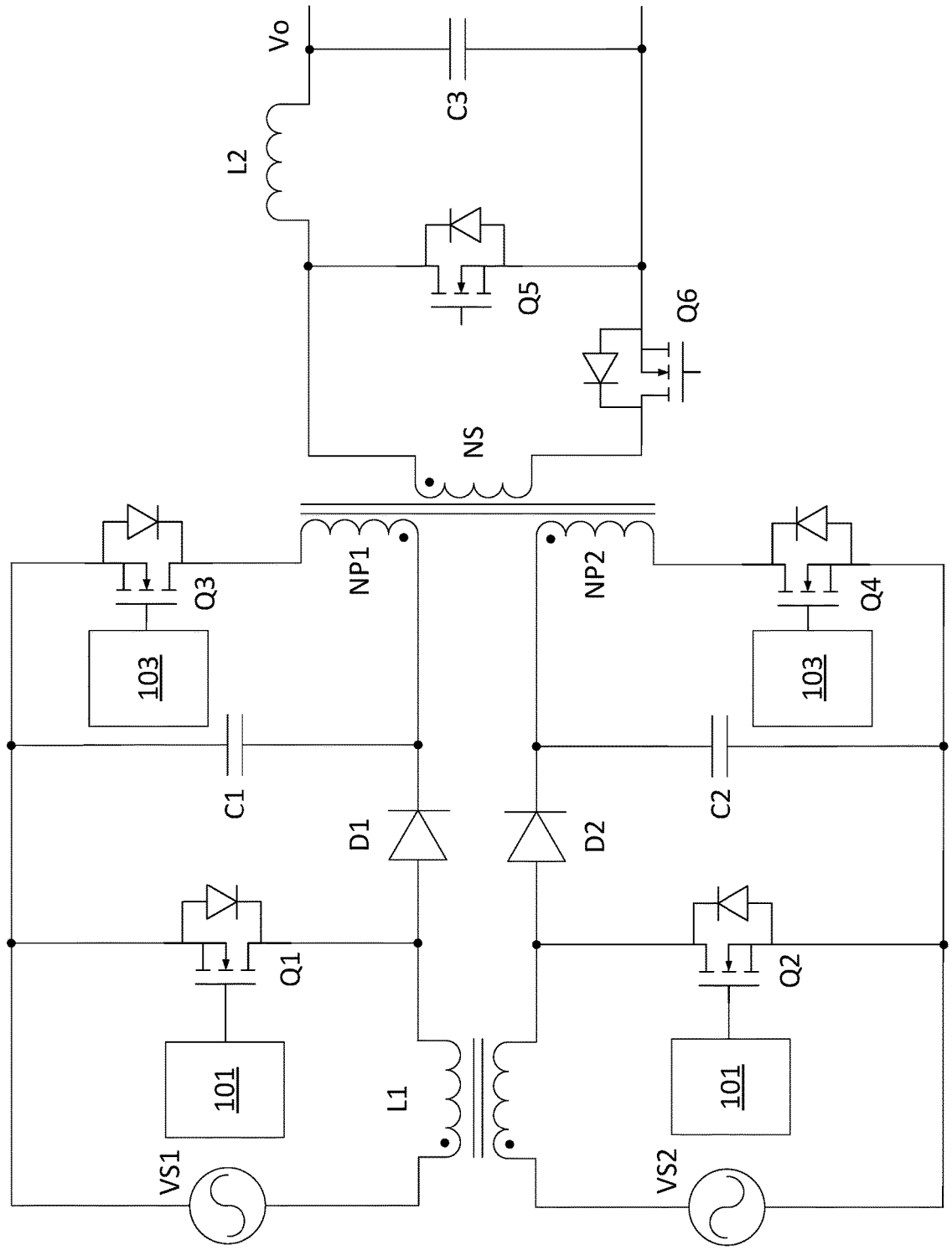
FIG. 5 illustrates a schematic diagram of a fourth implementation of the dual-input power conversion system shown in FIG. 1 in accordance with various embodiments of the present disclosure.

FIG. 5 illustrates a schematic diagram of a fourth implementation of the dual-input power conversion system shown in FIG. 1 in accordance with various embodiments of the present disclosure. The fourth implementation of the dual-input power conversion system shown in FIG. 5 is similar to the first implementation of the dual-input power conversion system shown in FIG. 2 except that the first rectifier diode and the second rectifier diode are replaced by two rectifier switches, respectively. It should be noted that replacement shown in FIG. 5 is merely an example. A person skilled in the art would understand there are many variations. For example, the first rectifier diode and the second rectifier diode are replaced by two MOSFET switches, a combination of MOSFET switches and diodes, any combinations thereof and the like.

As shown in FIG. 5, the rectifier comprises a first rectifier switch Q5 and a second rectifier switch Q6. The filter comprises an output inductor L2 and an output capacitor C3. A drain of the first rectifier switch Q5 is connected to a first terminal of a secondary winding NS of the transformer. A drain of the second rectifier switch Q6 is connected to a second terminal of the secondary winding NS of the transformer. A source of the first rectifier switch Q5 and a source of the second rectifier switch Q6 are connected together and further connected to a second terminal of the output capacitor C3. A first terminal of the output inductor L2 is connected to the first terminal of the secondary winding NS of the transformer. A first terminal of the output capacitor C3 is connected to a second terminal of the output inductor L2.

In some embodiments, Q3 of the first primary side power network 110, Q4 of the second primary side power network 120, the transformer, Q5, Q6 of the secondary side power network 140 and the filter form a converter with a forward topology. The operating principle of this forward topology has been described above with respect to FIG. 2, and hence is not discussed again herein.

Figure 6:
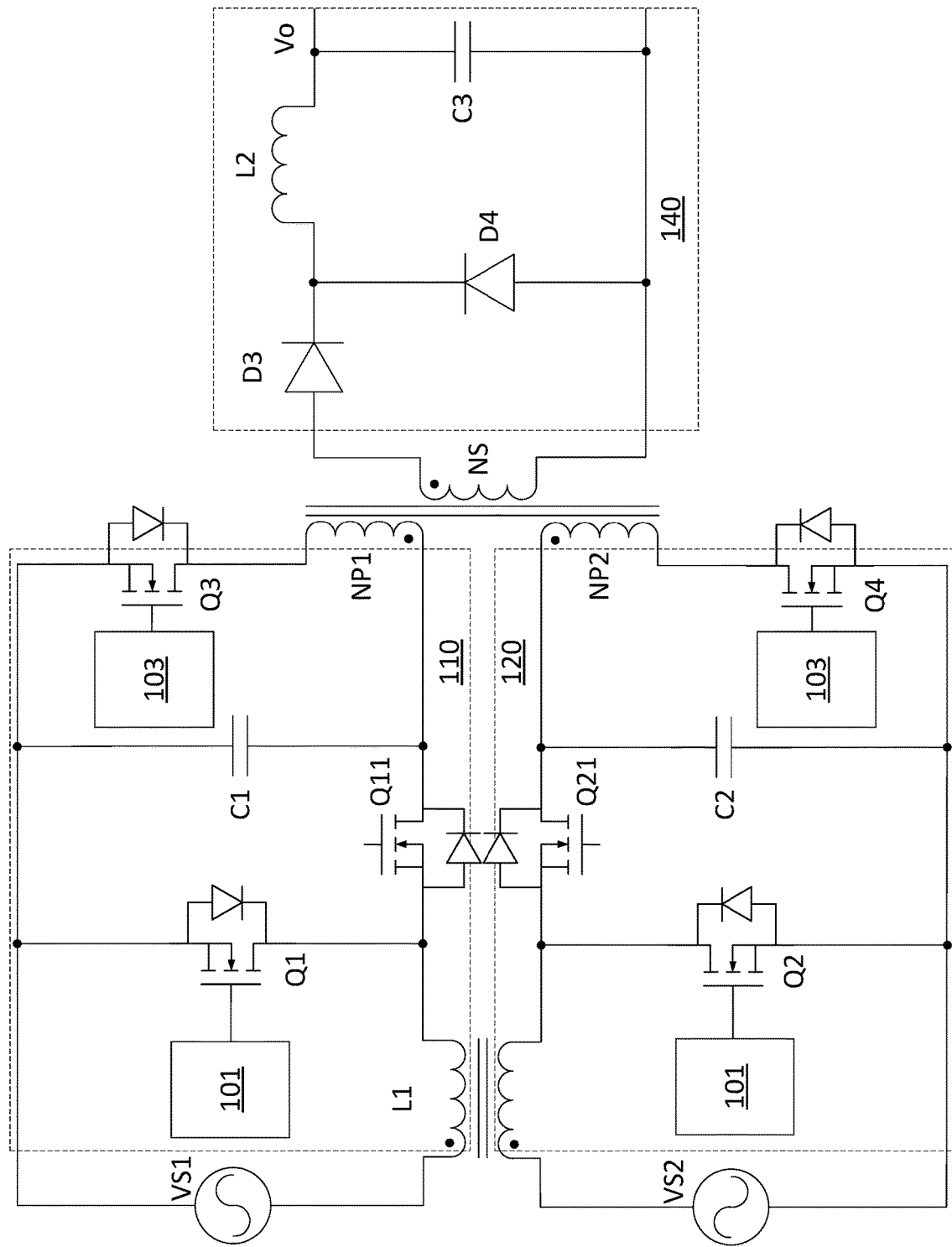
FIG. 6 illustrates a schematic diagram of a fifth implementation of the dual-input power conversion system shown in FIG. 1 in accordance with various embodiments of the present disclosure.

FIG. 6 illustrates a schematic diagram of a fifth implementation of the dual-input power conversion system shown in FIG. 1 in accordance with various embodiments of the present disclosure. The fifth implementation of the dual-input power conversion system shown in FIG. 6 is similar to the first implementation of the dual-input power conversion system shown in FIG. 2 except that the diodes D1 and D2 are replaced by two switches, respectively. It should be noted that replacement shown in FIG. 6 is merely an example. A person skilled in the art would understand there are many variations. For example, the diode D1 and the diode D2 are replaced by two MOSFET switches, a combination of MOSFET switches and diodes, any combinations thereof and the like.

As shown in FIG. 6, D1 is replaced by a third switch Q11. D2 is replaced by a fourth switch Q21. The first boost converter comprises a first magnetic element (a first winding of L1), a first switch Q1 and the third switch Q11. A first terminal of the first magnetic element is coupled to a first input of the first primary side power network. A second terminal of the first magnetic element is coupled to a source of the third switch Q11. The first switch Q1 is coupled between a common node of the first magnetic element and the third switch Q11, and a second input of the first primary side power network. The first hold-up capacitor C1 is coupled between a drain of the third switch Q11 and the second input of the first primary side power network. The second boost converter comprises a second magnetic element (a second winding of L1), a second switch Q2 and the fourth switch Q21. A first terminal of the second magnetic element is coupled to a first input of the second primary side power network. A second terminal of the first magnetic element is coupled to a source of the fourth switch Q21. The second switch Q2 is coupled between a common node of the second magnetic element and the fourth switch Q21, and a second input of the second primary side power network. The second hold-up capacitor C2 is coupled between a drain of the fourth switch Q21 and the second input of the second primary side power network.

It should be noted that the system configuration (diodes D1 and D2 are replaced by two switches) shown FIG. 6 is applicable to all other embodiments in the present disclosure. In other words, the system configuration variation shown in FIG. 6 can be combined with other embodiments in the present disclosure.

Figure 7:
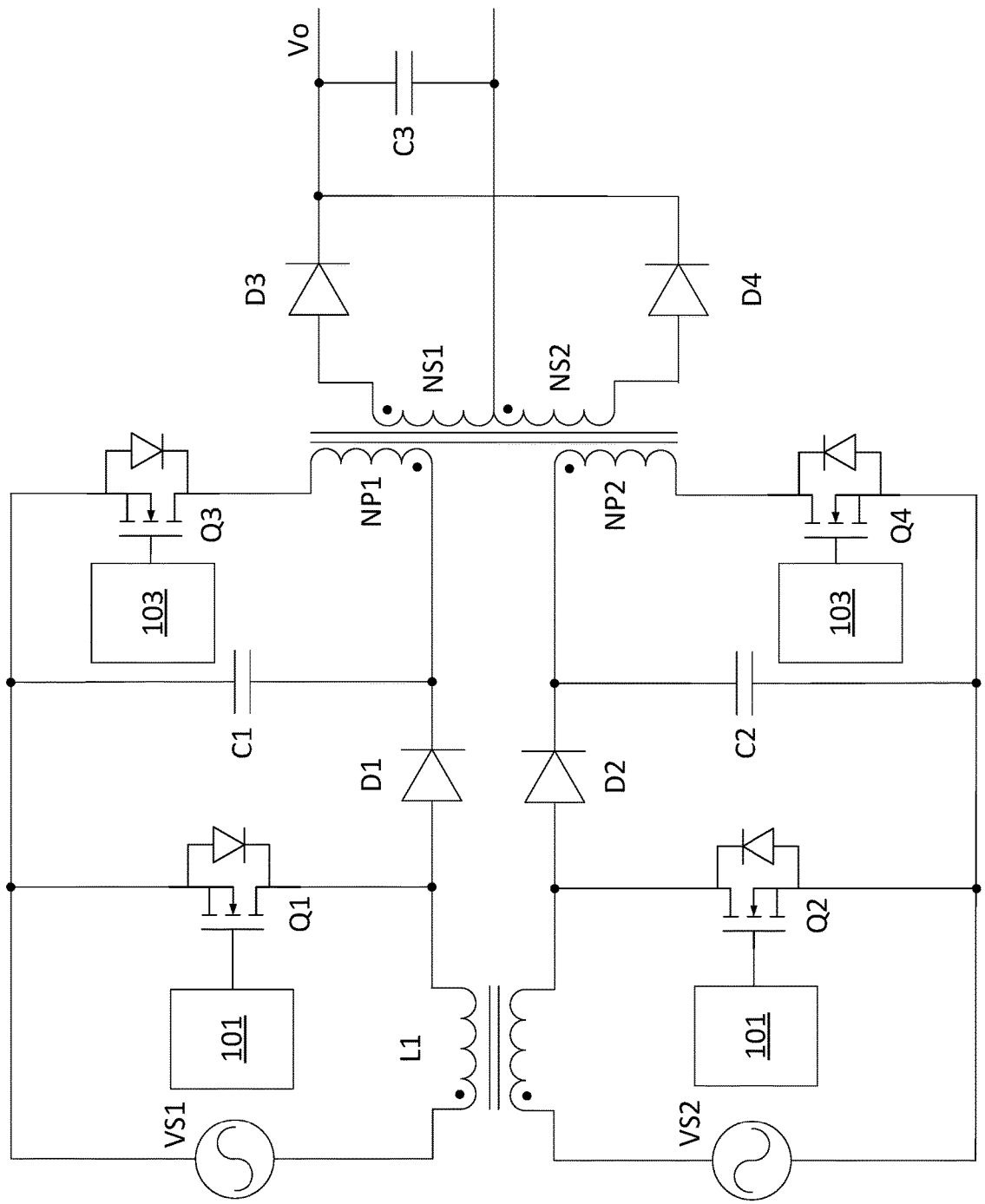
FIG. 7 illustrates a schematic diagram of a sixth implementation of the dual-input power conversion system shown in FIG. 1 in accordance with various embodiments of the present disclosure.

FIG. 7 illustrates a schematic diagram of a sixth implementation of the dual-input power conversion system shown in FIG. 1 in accordance with various embodiments of the present disclosure. The sixth implementation of the dual-input power conversion system shown in FIG. 7 is similar to the first implementation of the dual-input power conversion system shown in FIG. 2 except that the forward topology shown in FIG. 2 is replaced by a fly-forward topology.

As shown in FIG. 7, the rectifier comprises a first rectifier diode D3 and a second rectifier diode D4. The filter comprises an output capacitor C3. An anode of the first rectifier diode D3 is connected to a first terminal of a first secondary winding NS1 of the transformer. An anode of the second rectifier diode D4 is connected to a second terminal of a second secondary winding NS2 of the transformer. A cathode of the first rectifier diode D3 and a cathode of the second rectifier diode D4 are connected together and further connected to a first terminal of the output capacitor C3. A second terminal of the first secondary winding NS1 of the transformer is connected to a first terminal of the second secondary winding NS2 of the transformer and further connected to a second terminal of the output capacitor C3.

In some embodiments, Q3 of the first primary side power network 110, Q4 of the second primary side power network 120, the transformer, D3 and D4 of the secondary side power network 140 and the filter form a converter with the flyforward topology.

Figure 8:
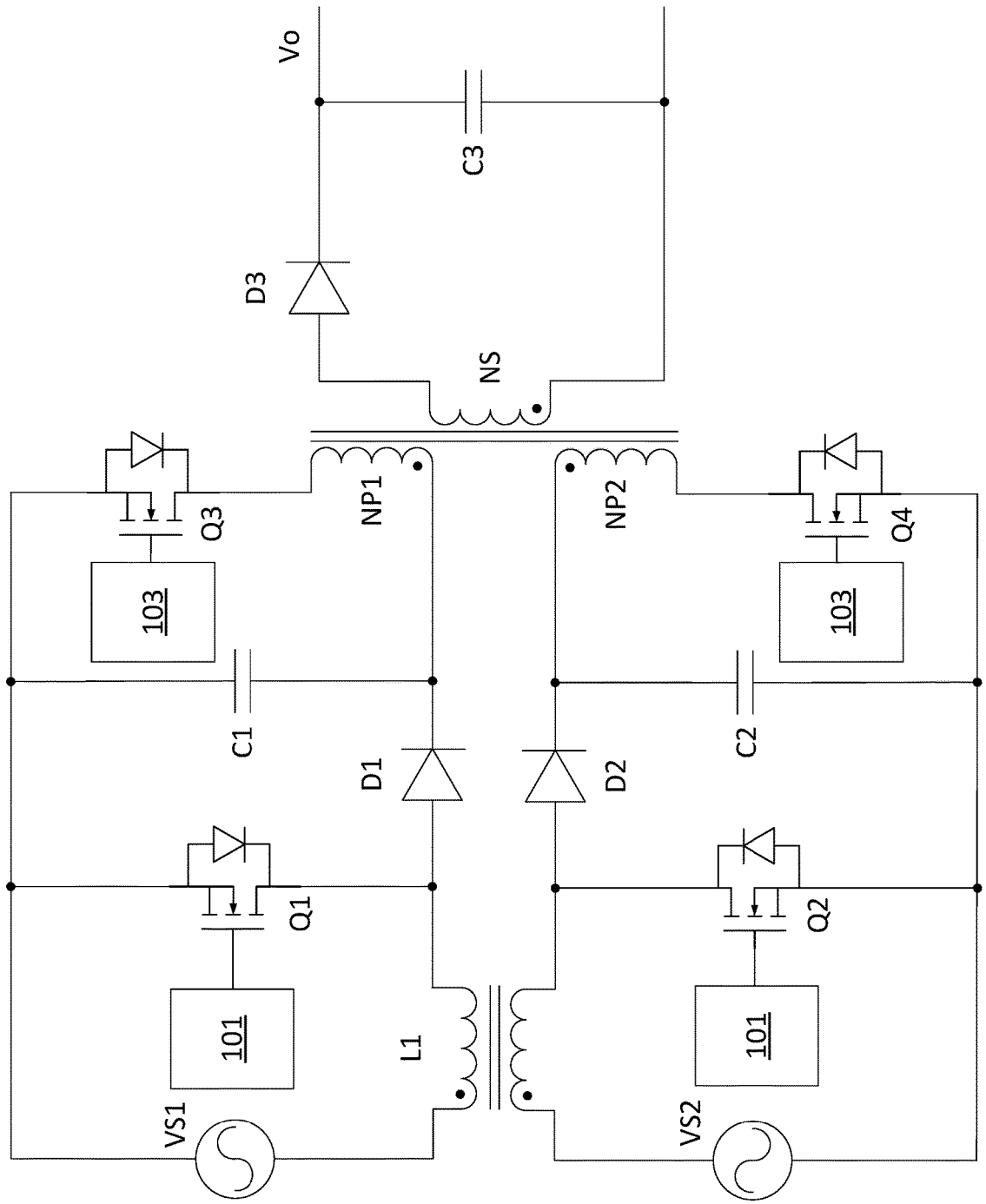
FIG. 8 illustrates a schematic diagram of a seventh implementation of the dual-input power conversion system shown in FIG. 1 in accordance with various embodiments of the present disclosure.

FIG. 8 illustrates a schematic diagram of a seventh implementation of the dual-input power conversion system shown in FIG. 1 in accordance with various embodiments of the present disclosure. The seventh implementation of the dual-input power conversion system shown in FIG. 8 is similar to the first implementation of the dual-input power conversion system shown in FIG. 2 except that the forward topology shown in FIG. 2 is replaced by a flyback topology.

As shown in FIG. 8, the rectifier comprises a rectifier diode D3. The filter comprises an output capacitor C3. An anode of the rectifier diode D3 is connected to a first terminal of a secondary winding NS of the transformer. A cathode of the rectifier diode D3 is connected to a first terminal of the output capacitor C3. A second terminal of the output capacitor C3 is connected to a second terminal of the secondary winding NS of the transformer.

In some embodiments, Q3 of the first primary side power network 110, Q4 of the second primary side power network 120, the transformer, D3 of the secondary side power network 140 and the filter form a converter with the flyback topology.

Figure 9:
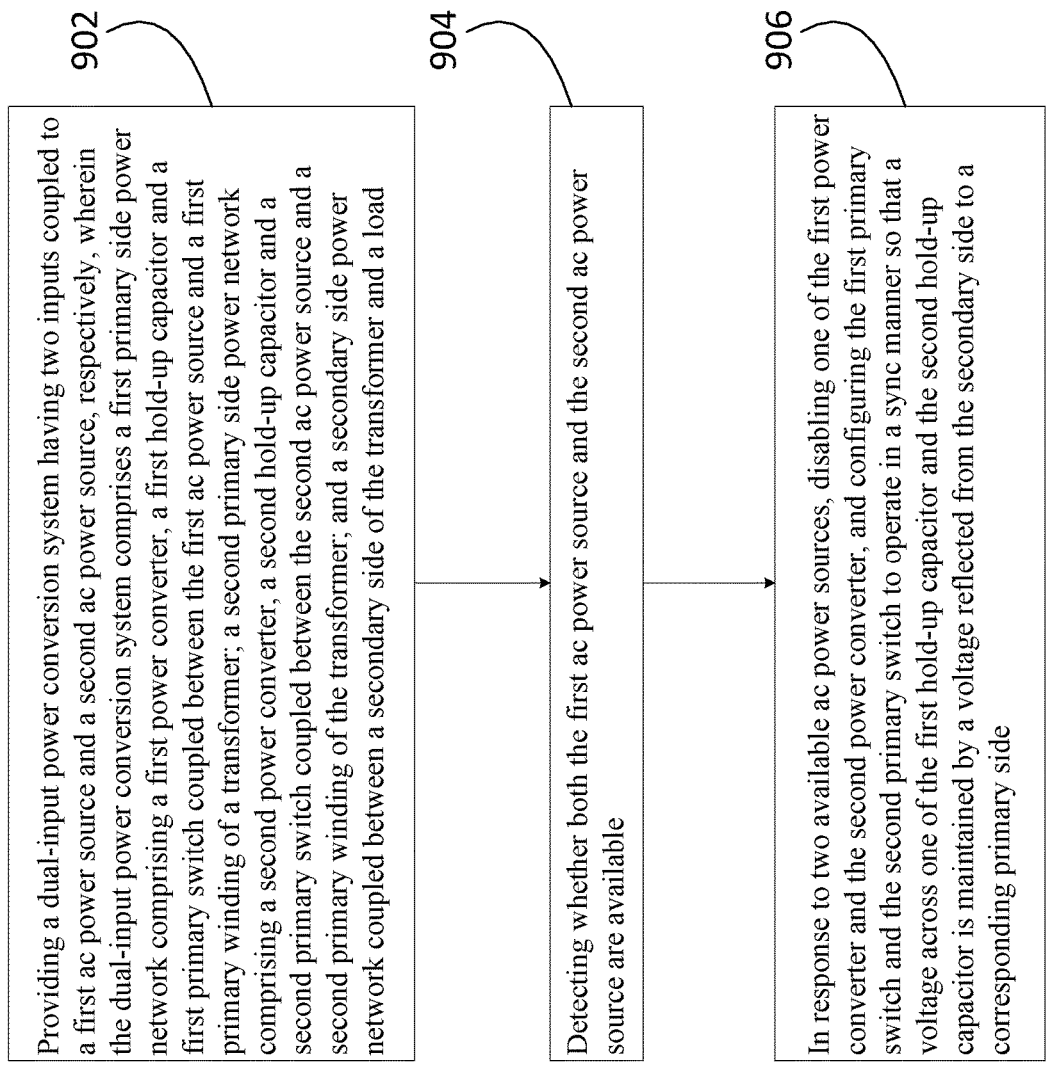
FIG. 9 illustrates a flow chart of controlling the dual-input power conversion system shown in FIG. 1 in accordance with various embodiments of the present disclosure.

FIG. 9 illustrates a flow chart of controlling the dual-input power conversion system shown in FIG. 1 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

Referring back to FIG. 1, a dual-input power conversion system comprises a first primary side power network (e.g., first primary side power network 110 shown in FIG. 1), a second primary side power network (e.g., second primary side power network 120 shown in FIG. 1), a transformer (e.g., transformer 130 shown in FIG. 1) and a secondary side power network (e.g., secondary side power network 140 shown in FIG. 1).

The first primary side power network comprises a first power converter (e.g., first power converter formed by Q1, D1 and a first winding of the coupled inductor L1 shown in FIG. 2), a first hold-up capacitor (e.g., hold-up capacitor C1 shown in FIG. 2) and a first primary switch (e.g., Q3 shown in FIG. 2) coupled between the first ac power source (e.g., VS1 shown in FIG. 2) and a first primary winding (e.g., NP1 shown in FIG. 2) of the transformer.

The second primary side power network comprises a second power converter (e.g., second power converter formed by Q2, D2 and a second winding of the coupled inductor L1 shown in FIG. 2), a second hold-up capacitor (e.g., hold-up capacitor C2 shown in FIG. 2) and a second primary switch (e.g., Q4 shown in FIG. 2) coupled between the second ac power source (e.g., VS2 shown in FIG. 2) and a second primary winding (e.g., NP2 shown in FIG. 2) of the transformer. The secondary side power network (e.g., D3, D4, L2 and C3 shown in FIG. 2) is coupled between a secondary side of the transformer and a load.

At step 902, a dual-input power conversion system is provided. The dual-input power conversion system has two inputs coupled to a first ac power source and a second ac power source, respectively.

The dual-input power conversion system comprises a first primary side power network comprising a first power converter, a first hold-up capacitor and a first primary switch coupled between the first ac power source and a first primary winding of a transformer, a second primary side power network comprising a second power converter, a second hold-up capacitor and a second primary switch coupled between the second ac power source and a second primary winding of the transformer, and a secondary side power network coupled between a secondary side of the transformer and a load.

At step 904, a system controller detects whether both the first ac power source and the second ac power source are available.

At step 906, in response to two available ac power sources, the system controller disables one of the first power converter and the second power converter, and configures the first primary switch and the second primary switch to operate in a sync manner so that a voltage across one of the first hold-up capacitor and the second hold-up capacitor is maintained by a voltage reflected from the secondary side to a corresponding primary side.

It should be noted the system controller has to disable one power converter when the inductor of the first power converter is magnetically coupled to the inductor of the second power converter (e.g., coupled inductor L1 shown in FIG. 2). Alternatively, when the inductor of the first power converter is not magnetically coupled to the inductor of the second power converter (e.g., inductors L11 and L12 shown in FIG. 4), both power converters can operate concurrently. The power converter (PFC circuit) with a higher output voltage provides more power to the load.

The method further comprises during a startup process of the dual-input power conversion system, enabling both the first power converter and the second power converter to establish a first voltage across the first hold-up capacitor and a second voltage across the second hold-up capacitor, establishing a bias voltage based on the first voltage across the first hold-up capacitor and the second voltage across the second hold-up capacitor, and detecting whether both the first ac power source and the second ac power source available once the bias voltage has been established.

The method further comprises during a startup process of the dual-input power conversion system, establishing a bias voltage using an independent ac/dc power converter, detecting whether both the first ac power source and the second ac power source available once the bias voltage has been established, and enabling one of the first power converter and the second power converter to establish a first voltage across the first hold-up capacitor and a second voltage across the second hold-up capacitor.

The method further comprises in response to the two available ac power sources, disabling the second power converter, and configuring the first ac power source to provide power to the load, and in response to a fault occurred in the first ac power source, disabling the first power converter, configuring the first hold-up capacitor and the second hold-up capacitor to provide power to the load, and enabling the second power converter to replenish the first hold-up capacitor and the second hold-up capacitor and provide power to the load.

Referring back to FIG. 2, the first power converter is a first boost converter, and the second power converter is a second boost converter. An inductor of the first boost converter and an inductor of the second boost converter are magnetically coupled to each other to form a coupled inductor.

The method further comprises configuring the first boost converter as a first power factor correction circuit when the first boost converter is enabled, and configuring the second boost converter as a second power factor correction circuit when the second boost converter is enabled.

The method further comprises configuring the first primary switch, the second primary switch, the transformer and the secondary side power network to form a converter with a forward topology.

The method further comprises configuring the first primary switch, the second primary switch, the transformer and the secondary side power network to form a converter with a fly-forward topology.

The method further comprises configuring the first primary switch, the second primary switch, the transformer and the secondary side power network to form a converter with a flyback topology.

Figure 10:
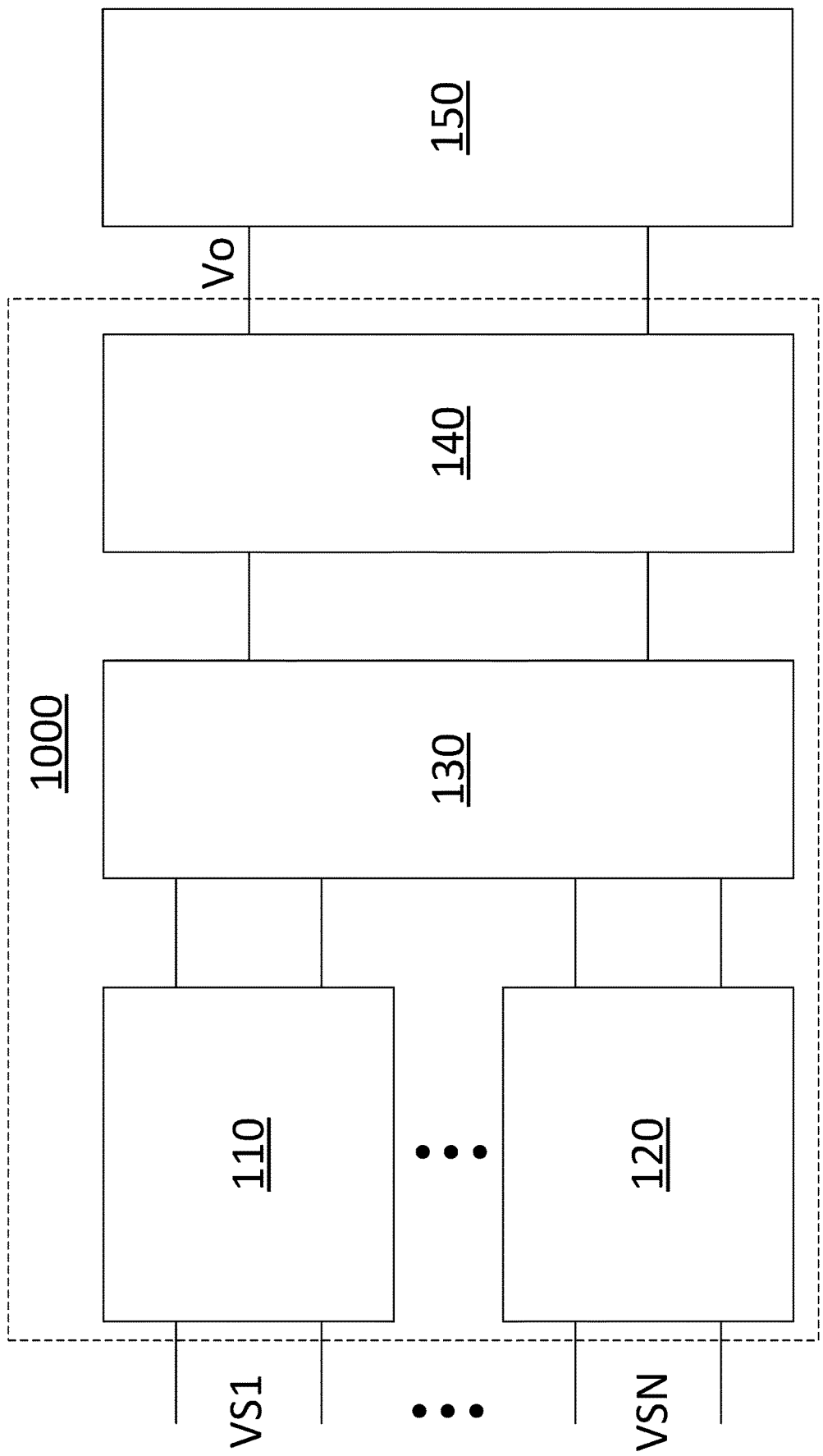
FIG. 10 illustrates a block diagram of a multiple-input power conversion system in accordance with various embodiments of the present disclosure.

FIG. 10 illustrates a block diagram of a multiple-input power conversion system in accordance with various embodiments of the present disclosure. The multiple-input power conversion system 1000 is similar to the dual-input power conversion system 100 shown in FIG. 1 except that the inputs of the multiple-input power conversion system 1000 are more than two. The systems and the associated control methods described above are applicable to the multiple-input power conversion system 1000. In operation, at least one input and the associated power conversion circuit are disabled. The voltage across the hold-up capacitor of the disabled power conversion circuit is maintained by a reflected voltage.

In some embodiments, the power sources VS1 and VSN shown in FIG. 10 are a plurality of ac power sources. Under this system configuration, each ac power source is coupled to the hold-up capacitor (e.g., hold-up capacitor C1 shown in FIG. 2) through the boost converter (e.g., first boost converter formed by a first winding of L1, Q1 and D1 shown in FIG. 2). In alternative embodiments, the power sources VS1 and VSN shown in FIG. 10 are a plurality of dc power sources. Under this system configuration, each dc power source is connected in parallel with the hold-up capacitor. Furthermore, the power sources VS1 and VSN shown in FIG. 10 can be implemented as a plurality of power sources including both ac power sources and dc power sources. Under this system configuration, each dc power source is connected in parallel with the hold-up capacitor. Each ac power source is coupled to the hold-up capacitor through the boost converter.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A power conversion system comprising:
a first primary side power network comprising a first hold-up capacitor, wherein the first primary side power network has inputs configured to be coupled to a first power source, and outputs coupled to a transformer;
a second primary side power network comprising a second hold-up capacitor, wherein the second primary side power network has inputs configured to be coupled to a second power source, and outputs coupled to the transformer; and
a secondary side power network having inputs coupled to a secondary side of the transformer, and outputs coupled to a load, wherein a switch of the first primary side power network and a switch of the second primary side power network are configured to be turned on and off in a sync manner such that a voltage across one of the first hold-up capacitor and the second hold-up capacitor is maintained by a voltage reflected from the secondary side to a corresponding primary side, and wherein as a result of configuring the first primary switch and the second primary switch to be turned on and off in the sync manner, both the first hold-up capacitor and the second hold-up capacitor function as energy storage elements, and wherein when one power source is disabled and a fault occurs in the other power source, both the first hold-up capacitor and the second hold-up capacitor function effectively as a single large hold-up capacitor providing power to the load through the transformer.

2. The power conversion system of claim 1, wherein:
the first power source is a first ac power source;
the second power source is a second ac power source;
the first primary side power network comprises a first boost converter and a primary side circuit of a first forward converter; and
the second primary side power network comprises a second boost converter and a primary side circuit of a second forward converter.

3. The power conversion system of claim 2, wherein:
the first boost converter comprises a first magnetic element, a first switch and a first diode, and wherein:
a first terminal of the first magnetic element is coupled to a first input of the first primary side power network;
a second terminal of the first magnetic element is coupled to an anode of the first diode;
the first switch is coupled between a common node of the first magnetic element and the first diode, and a second input of the first primary side power network; and
the first hold-up capacitor is coupled between a cathode of the first diode and the second input of the first primary side power network; and
the second boost converter comprises a second magnetic element, a second switch and a second diode, and wherein:
a first terminal of the second magnetic element is coupled to a first input of the second primary side power network;
a second terminal of the first magnetic element is coupled to an anode of the second diode;

the second switch is coupled between a common node of the second magnetic element and the second diode, and a second input of the second primary side power network; and the second hold-up capacitor is coupled between a cathode of the second diode and the second input of the second primary side power network.

4. The power conversion system of claim 3, wherein:
the first input and the second input of the first primary side power network are configured to be coupled to the first ac power source; and
the first input and the second input of the second primary side power network are configured to be coupled to the second ac power source.

5. The power conversion system of claim 3, wherein:
the first magnetic element and the second magnetic element are magnetically coupled to each other to form a coupled inductor.

6. The power conversion system of claim 3, wherein:
the first magnetic element and the second magnetic element are two separate inductors.

7. The power conversion system of claim 3, further comprising:
a controller configured to generate gate drive signals for the first switch and the second switch.

8. The power conversion system of claim 3, further comprising:
a first controller configured to generate a first gate drive signal for the first switch; and
a second controller configured to generate a second gate drive signal for the second switch.

9. The power conversion system of claim 3, wherein:
the primary side circuit of the first forward converter comprises a first primary switch connected in series with a first primary winding of the transformer; and
the primary side circuit of the second forward converter comprises a second primary switch connected in series with a second primary winding of the transformer.

10. The power conversion system of claim 9, wherein:
after the first boost converter is disabled, the first primary switch and the second primary switch are configured to be turned on and off in a sync manner so that the voltage reflected from the secondary side is used to maintain a voltage across the first hold-up capacitor.

11. The power conversion system of claim 1, wherein:
the secondary side power network comprises a rectifier and a filter connected in cascade between the secondary side of the transformer and the load.

12. The power conversion system of claim 11, wherein:
the rectifier comprises a first rectifier diode and a second rectifier diode;
the filter comprises an output inductor and an output capacitor, and wherein:
an anode of the first rectifier diode is connected to a first terminal of a secondary winding of the transformer;
an anode of the second rectifier diode is connected to a second terminal of the secondary winding of the transformer;
a cathode of the first rectifier diode and a cathode of the second rectifier diode are connected together and further connected to a first terminal of the output inductor;
a second terminal of the output inductor is connected to a first terminal of the output capacitor; and
a second terminal of the output capacitor is connected to the second terminal of the secondary winding of the transformer, and wherein the first primary side power network, the second primary side power network, the transformer and the secondary side power network form a converter with a forward topology.

13. The power conversion system of claim 11, wherein:
the rectifier comprises a first rectifier switch and a second rectifier switch;
the filter comprises an output inductor and an output capacitor, and wherein:
a drain of the first rectifier switch is connected to a first terminal of a secondary winding of the transformer;
a drain of the second rectifier switch is connected to a second terminal of the secondary winding of the transformer;
a source of the first rectifier switch and a source of the second rectifier switch are connected together and further connected to a second terminal of the output capacitor;
a first terminal of the output inductor is connected to the first terminal of the secondary winding of the transformer; and
a first terminal of the output capacitor is connected to a second terminal of the output inductor, and wherein the first primary side power network, the second primary side power network, the transformer and the secondary side power network form a converter with a forward topology.

14. The power conversion system of claim 11, wherein:
the rectifier comprises a first rectifier diode and a second rectifier diode;
the filter comprises an output capacitor, and wherein:
an anode of the first rectifier diode is connected to a first terminal of a first secondary winding of the transformer;
an anode of the second rectifier diode is connected to a second terminal of a second secondary winding of the transformer;
a cathode of the first rectifier diode and a cathode of the second rectifier diode are connected together and further connected to a first terminal of the output capacitor; and
a second terminal of the first secondary winding of the transformer is connected to a first terminal of the second secondary winding of the transformer and further connected to a second terminal of the output capacitor, and wherein the first primary side power network, the second primary side power network, the transformer and the secondary side power network form a converter with a fly-forward topology.

15. The power conversion system of claim 11, wherein:
the rectifier comprises a rectifier diode;
the filter comprises an output capacitor, and wherein:
an anode of the rectifier diode is connected to a first terminal of a secondary winding of the transformer;
a cathode of the rectifier diode is connected to a first terminal of the output capacitor; and
a second terminal of the output capacitor is connected to a second terminal of the secondary winding of the transformer, and wherein the first primary side power network, the second primary side power network, the transformer and the secondary side power network form a converter with a flyback topology.

16. The power conversion system of claim 1, wherein:
the first primary side power network comprises a first boost converter and a primary side circuit of a first forward converter; and the second primary side power network comprises a second boost converter and a primary side circuit of a second forward converter, and wherein:
the first boost converter comprises a first magnetic element, a first switch and a third switch, and wherein:
a first terminal of the first magnetic element is coupled to a first input of the first primary side power network;
a second terminal of the first magnetic element is coupled to a source of the third switch;
the first switch is coupled between a common node of the first magnetic element and the third switch, and a second input of the first primary side power network; and
the first hold-up capacitor is coupled between a drain of the third switch and the second input of the first primary side power network; and
the second boost converter comprises a second magnetic element, a second switch and a fourth switch, and wherein:
a first terminal of the second magnetic element is coupled to a first input of the second primary side power network;
a second terminal of the first magnetic element is coupled to a source of the fourth switch;
the second switch is coupled between a common node of the second magnetic element and the fourth switch, and a second input of the second primary side power network; and
the second hold-up capacitor is coupled between a drain of the fourth switch and the second input of the second primary side power network.

17. A method comprising:
providing a dual-input power conversion system having two inputs coupled to a first ac power source and a second ac power source, respectively, wherein the dual-input power conversion system comprises:
a first primary side power network comprising a first power converter, a first hold-up capacitor and a first primary switch coupled between the first ac power source and a first primary winding of a transformer;
a second primary side power network comprising a second power converter, a second hold-up capacitor and a second primary switch coupled between the second ac power source and a second primary winding of the transformer; and
a secondary side power network coupled between a secondary side of the transformer and a load;
detecting whether both the first ac power source and the second ac power source are available;
in response to two available ac power sources, disabling the second power converter and configuring the first ac power source to provide power to the load, and configuring the first primary switch and the second primary switch to operate in a sync manner so that a voltage across one of the first hold-up capacitor and the second hold-up capacitor is maintained by a voltage reflected from the secondary side to a corresponding primary side; and in response to a fault occurred in the first ac power source, disabling the first power converter, configuring the first hold-up capacitor and the second hold-up capacitor to provide power to the load, and enabling the second power converter to replenish the first hold-up capacitor and the second hold-up capacitor, and provide power to the load.

18. The method of claim 17, further comprising:
during a startup process of the dual-input power conversion system, enabling both the first power converter and the second power converter to establish a first voltage across the first hold-up capacitor and a second voltage across the second hold-up capacitor;
establishing a bias voltage based on the first voltage across the first hold-up capacitor and the second voltage across the second hold-up capacitor; and
detecting whether both the first ac power source and the second ac power source available once the bias voltage has been established.

19. The method of claim 17, further comprising:
during a startup process of the dual-input power conversion system, establishing a bias voltage using an independent ac/dc power converter;
detecting whether both the first ac power source and the second ac power source available once the bias voltage has been established; and
enabling one of the first power converter and the second power converter to establish a first voltage across the first hold-up capacitor and a second voltage across the second hold-up capacitor.

20. The method of claim 17, wherein:
the first power converter is a first boost converter; and
the second power converter is a second boost converter.

21. The method of claim 20, wherein:
an inductor and the first boost converter and an inductor of the second boost converter are magnetically coupled to each other to form a coupled inductor.

22. The method of claim 20, further comprising:
configuring the first boost converter as a first power factor correction circuit when the first boost converter is enabled; and
configuring the second boost converter as a second power factor correction circuit when the second boost converter is enabled.

23. The method of claim 17, wherein:
the first ac power source is independent from the second ac power source.

24. The method of claim 17, further comprising:
configuring the first primary switch, the second primary switch, the transformer and the secondary side power network to form a converter with a forward topology.

25. The method of claim 17, further comprising:
configuring the first primary switch, the second primary switch, the transformer and the secondary side power network to form a converter with a fly-forward topology.

26. The method of claim 17, further comprising:
configuring the first primary switch, the second primary switch, the transformer and the secondary side power network to form a converter with a flyback topology.

* * * * *